(12) United States Patent
Ma et al.

(10) Patent No.: US 11,113,893 B1
(45) Date of Patent: Sep. 7, 2021

(54) ARTIFICIAL REALITY ENVIRONMENT WITH GLINTS DISPLAYED BY AN EXTRA REALITY DEVICE

(71) Applicant: Facebook Technologies, LLC, Menlo Park, CA (US)

(72) Inventors: Jing Ma, Mill Creek, WA (US); Gerrit Hendrik Hofmeester, Seattle, WA (US); John Jacob Blakeley, Seattle, WA (US); Camila Cortes De Almeida e De Vincenzo, Seattle, WA (US); Gagneet Singh Mac, Pacifica, CA (US); Jenna Velez, Seattle, WA (US); Cody Char, Seattle, WA (US); Annika Rodrigues, Lynnwood, WA (US); Michael Luo, Seattle, WA (US)

(*) Notice: Subject to any disclaimer, the term of this patent is extended or adjusted under 35 U.S.C. 154(b) by 0 days.

(21) Appl. No.: 16/950,823

(22) Filed: Nov. 17, 2020

(51) Int. Cl.
*G06T 19/00* (2011.01)
*G06Q 50/00* (2012.01)
*G02B 27/00* (2006.01)
*G02B 27/01* (2006.01)

(52) U.S. Cl.
CPC ........ *G06T 19/006* (2013.01); *G02B 27/0093* (2013.01); *G06Q 50/01* (2013.01); *G02B 27/017* (2013.01)

(58) Field of Classification Search
CPC ... G06T 19/006; G02B 27/0093; G06Q 50/01
See application file for complete search history.

(56) References Cited

U.S. PATENT DOCUMENTS

| 770,149 A | 9/1904 | Bailey |
| 6,842,175 B1 | 1/2005 | Schmalstieg et al. |
| 8,558,759 B1 | 10/2013 | Gomez et al. |
| 8,947,351 B1 | 2/2015 | Noble |
| 9,081,177 B2 * | 7/2015 | Wong ................... G06T 19/006 |

(Continued)

FOREIGN PATENT DOCUMENTS

WO 2018235371 A1 12/2018

OTHER PUBLICATIONS

"Unity Gets Toolkit for Common AR/VR Interactions" [accessed Apr. 7, 2020]. Unity XR Interaction Toolkit Preview Dec. 19, 2019.

(Continued)

*Primary Examiner* — Sarah Lhymn
(74) *Attorney, Agent, or Firm* — Potomac Law Group, PLLC

(57) ABSTRACT

The present embodiments relate to display of glints associated with real-world objects in an environment displayed on an extra reality (XR) device. The glint can include a virtual object associated with a real-world object, such as an indication of a social interaction associated with a real-world object, a content item tagged to an object, etc. The system as described herein can present glints on a display of an XR device based on a distance between the XR device and a location associated with the glint. Responsive to selection of a glint in the environment, additional information can be presented relating to the glint or another action can be taken, such as to open an application. In some instances, a glint can include a series of search results relating to a corresponding real-world object to provide additional information relating to the real-world object.

20 Claims, 15 Drawing Sheets

(56) References Cited

U.S. PATENT DOCUMENTS

| | | |
|---|---|---|
| 9,117,274 B2 | 8/2015 | Liao et al. |
| 9,292,089 B1 | 3/2016 | Sadek |
| 9,477,368 B1 | 10/2016 | Filip et al. |
| 9,817,472 B2 | 11/2017 | Lee et al. |
| 10,220,303 B1 | 3/2019 | Schmidt et al. |
| 10,248,284 B2 | 4/2019 | Itani et al. |
| 10,473,935 B1 | 11/2019 | Gribetz et al. |
| 10,521,944 B2 | 12/2019 | Sareen et al. |
| 2008/0089587 A1 | 4/2008 | Kim et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0265220 A1 | 10/2013 | Fleischmann et al. |
| 2014/0125598 A1 | 5/2014 | Cheng et al. |
| 2014/0236996 A1 | 8/2014 | Masuko et al. |
| 2014/0357366 A1 | 12/2014 | Koganezawa et al. |
| 2014/0375683 A1* | 12/2014 | Salter ................ G02B 27/0172 345/633 |
| 2014/0375691 A1 | 12/2014 | Kasahara |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1 | 9/2015 | Bader et al. |
| 2015/0356774 A1 | 12/2015 | Gal et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0378291 A1 | 12/2016 | Pokrzywka |
| 2017/0060230 A1 | 3/2017 | Faaborg et al. |
| 2017/0076500 A1 | 3/2017 | Maggiore et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0323488 A1 | 11/2017 | Mott et al. |
| 2017/0364198 A1 | 12/2017 | Yoganandan et al. |
| 2018/0059901 A1 | 3/2018 | Gullicksen |
| 2018/0113599 A1 | 4/2018 | Yin |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0357780 A1 | 12/2018 | Young et al. |
| 2019/0094981 A1 | 3/2019 | Bradski et al. |
| 2019/0107894 A1 | 4/2019 | Hebbalaguppe et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0362562 A1 | 11/2019 | Benson |
| 2019/0369391 A1 | 12/2019 | Cordesses et al. |
| 2019/0377416 A1 | 12/2019 | Alexander |
| 2020/0082629 A1 | 3/2020 | Jones et al. |
| 2020/0097091 A1 | 3/2020 | Chou et al. |
| 2020/0218423 A1 | 7/2020 | Ohashi |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2021/0012113 A1 | 1/2021 | Petill et al. |

OTHER PUBLICATIONS

Hincapie-Ramos, J. D. et al. "GyroWand: IMU-based raycasting for augmented reality head-mounted displays" Proceedings of the 3rd ACM Symposium on Spatial User Interaction, Aug. 2015, pp. 89-98.

International Search Report and Written Opinion, PCT Patent Application PCT/US2020/051763, dated Feb. 3, 2021, 11 pages.

Mayer, S. et al. "The effect of offset correction and cursor on mid-air pointing in real and virtual environments." Proceedings of the 2018 CHI Conference on Human Factors in Computing Systems, Apr. 2018, pp. 1-13.

Olwal, A. et al. "The Flexible Pointer: An Interaction Technique for Selection in Augmented and Virtual Reality," Proceedings of ACM Symposium on User Interface Software and Technology (UIST), pp. 81-82, publication date Nov. 5, 2003.

Renner, P. et al. "Ray Casting", [accessed Apr. 7, 2020], 2 pages.

Schweigert, R. et al. "EyePointing: A gaze-based selection technique." Proceedings of Mensch and Computer, Sep. 8, 2019, pp. 719-723.

* cited by examiner

ARTIFICIAL REALITY ENVIRONMENT WITH GLINTS DISPLAYED BY AN EXTRA REALITY DEVICE

TECHNICAL FIELD

The present disclosure is directed to display of glint virtual objects in an artificial reality environment provided by an extra reality (XR) device.

BACKGROUND

An extra reality (XR) device, such as an augmented reality (AR) device or virtual reality (VR) device, can be used to display additional content over a depiction of a real-world environment. The XR device can also facilitate social media content interaction by displaying social content on the display of the XR device. For instance, users on an XR device can view objects in an environment or social interactions on a social media platform via the XR device. Such users may have an interest in interacting with various real or virtual objects or landmarks. For example, individuals can comment on or take photos of a landmark building and can post such content on various social media platforms to share the interactions with various points of interest. Users on social media platforms can add a geographic tag or indicator identifying a geographic location of the point of interest/landmark. Other users on social media platforms can interact with tagged social content and provide additional content, allowing for greater engagement between users of the social media platforms.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
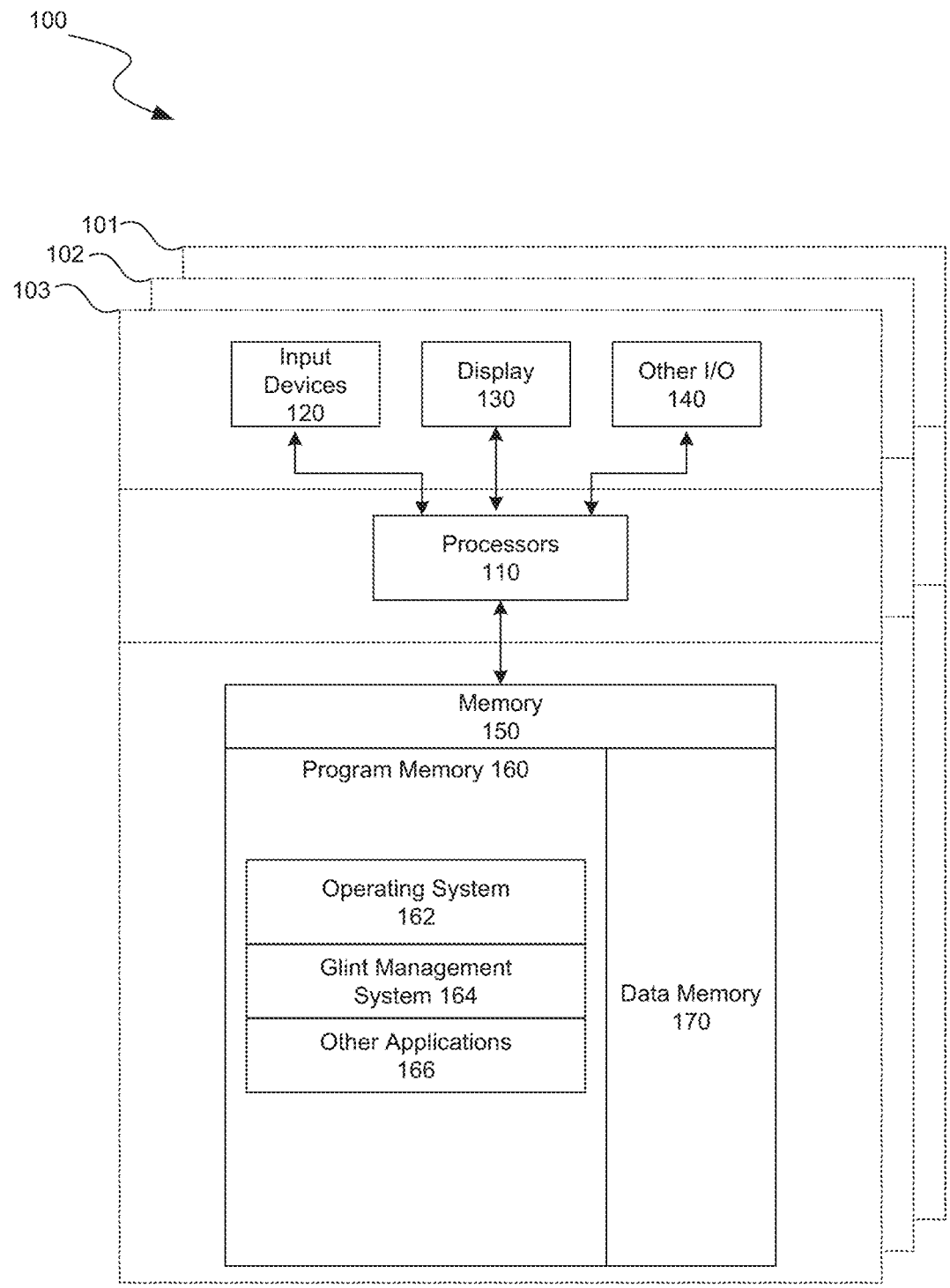
FIG. 1 is a block diagram illustrating an overview of devices on which some implementations of the present technology can operate.

Aspects of the present disclosure are directed to a glint management system that can display glints on a display of an XR device and control how glints respond to an artificial environment and user interaction. A "glint," as used herein, is an actionable virtual object, anchored to another object, that can provide access to additional information or another application. An environment displayed on the XR device can include both real-world objects and virtual objects. Such a virtual object can include a glint, a 3D model, a virtual indication of a social interaction (e.g., image, video, comment), etc. In some cases a glint is a representation of another virtual object, e.g., as a minimized view. A glint displayed in the environment can be actionable for a user to view additional information, open an application, etc. A glint can be anchored (e.g., displayed relative to) to another object such as a real-world object, a virtual object, or a physical location. In some cases, glints can be representations of various types of content items provided by various applications, such as social media posts, songs, videos, AR effects, coupons, products for sale, informational signs, (e.g., business hours), landmarks or other mapping items, educational posts, pictures, annotations, and many others.

The glint management system can present glints on a display of an XR device based on a distance between the user/XR device and a location associated with the glint. For instance, responsive to a glint being located beyond a far threshold distance, the glint is displayed only on a "compass" portion of the display. As discussed below, a compass can be one of a variety of user interfaces indicating a location and/or direction of glints such as a mini-map, indicators for the glints laid out according to their direction and/or distance, etc. As another example, responsive to the glint being within a far threshold distance but beyond a close threshold distance, the glint can be displayed a threshold amount above a corresponding object. Additionally, responsive to the glint being within both a far threshold distance and a close threshold distance, the glint can be displayed as attached to the object.

Responsive to a selection of a glint (e.g., manual user selection or inferred selection based on a determined direction of user attention), the glint may be modified to present additional information, such as social content relating to the glint or a preview of content. Further, in some instances, in response to a selection of the glint or information associated with the glint, an action can be performed, such as to open an application or link corresponding to the glint.

In some embodiments, responsive object detection techniques that detect features of a real-world object, the features of the detected object can be processed to derive a series of relevant search results. The search results can be presented as glints attached to the real-world object.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing XR systems can provide virtual objects, however, as more of these objects are displayed, the view can become cluttered and difficult to use. The present embodiments can improve computing and/or computer system processing by actively managing which virtual objects an application can create and requiring that some be displayed as glints. This established structure can improve computing efficiency by enabling reuse of the same structure, reduces the cognitive load on the user by having a this consistent unit of display for some virtual objects, increases data transmission efficiency by allowing relatively simple representations to be initially displayed while more resources are pre-loaded in the background or are only loaded on-demand as a user interacts with glints of interest to them. Presenting glints associated with real-world or other virtual objects displayed on an XR device further enables various display efficiencies over existing XR systems, such as the ability to group these virtual objects into a single, expandable glint or to display glints relative to various anchors such as by anchoring a glint to different parts of a building. Accordingly, rather than only using geographic tags to identify a location of an interaction, the present system can present both real-world objects and virtual objects on a single display of the environment on an XR device. Glints can also provide efficient actions, such as by displaying, responsive to selection of a glint, additional information relating to the glint, (e.g., an image from a social media platform), a preview of associated 3D content, quick links into actions in an application, etc.

Further, embodiments of the present system can include presenting multiple glints in an environment depicted in the XR device. The glints can be associated with disparate applications/platforms and can be displayed based on their distance to a location of the user/the XR device (e.g., displayed on a compass portion of the display, displayed above the real-world object, displayed attached to the real-world device). Additionally, upon selection of a glint, a subsequent action can be performed, such as opening an application or displaying additional content on the display. This can increase computational efficiency by providing a series of glints on a display and providing additional content or execution of an application responsive to selection of a glint.

Several implementations are discussed below in more detail in reference to the figures. FIG. 1 is a block diagram illustrating an overview of devices on which some implementations of the disclosed technology can operate. The devices can comprise hardware components of a computing system 100 that is capable of processing and displaying glints on an XR device. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a glint management system 164, and other application programs 166. The glint management system 164 can select which glints to display and can control how glints react to the artificial environment and user interaction, as discussed below in relation to FIGS. 5-13. Memory 150 can also include data memory 170 that can include instructions for processing and displaying glint content, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
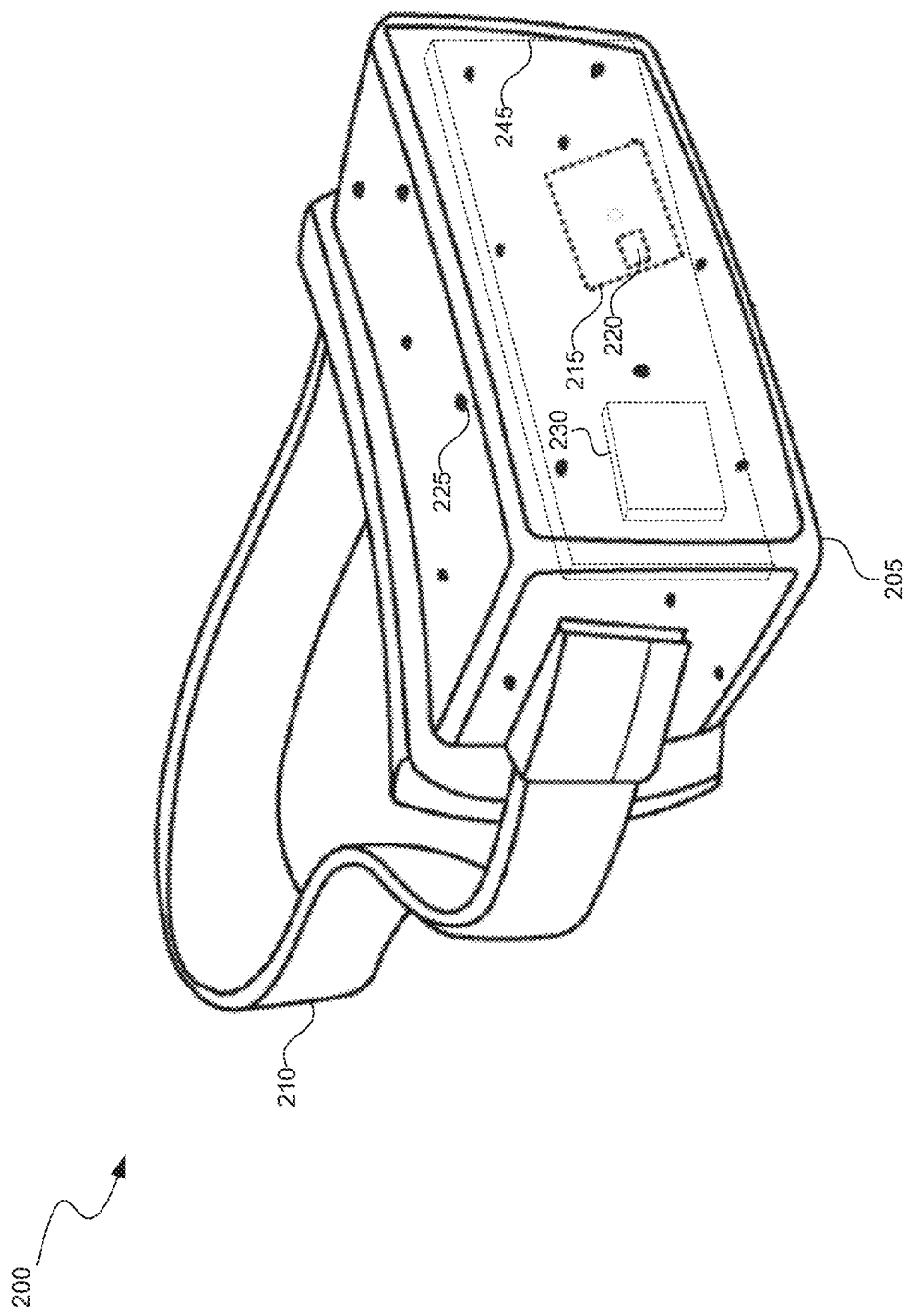
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

In some implementations, the HMD 200 can be in communication with one or more other external devices, such as controllers (not shown) which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc. In some implementations, instead of or in addition to controllers, one or more cameras included in the HMD 200 or external to it can monitor the positions and poses of the user's hands to determine gestures and other hand and body motions.

Figure 2B:
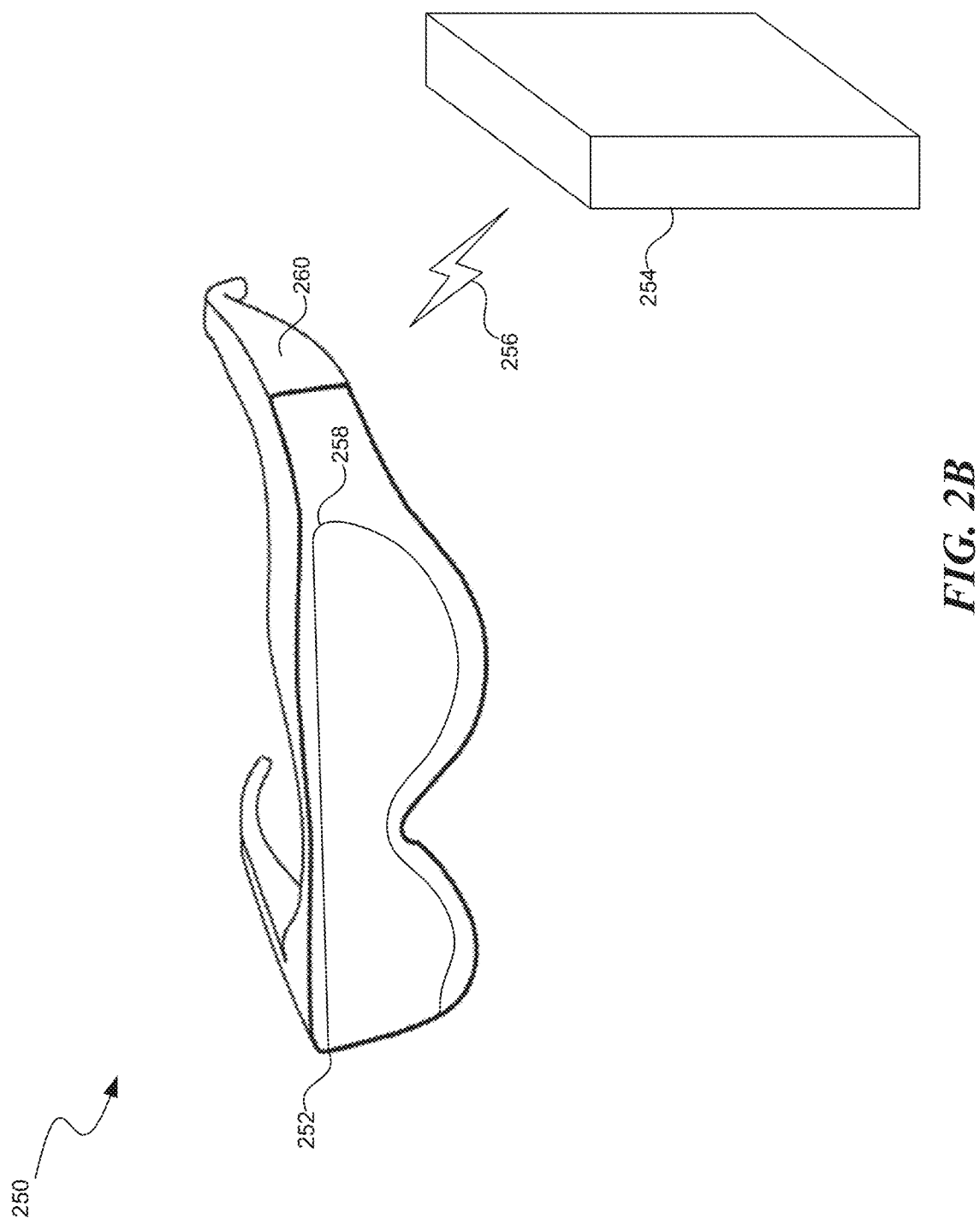
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3:
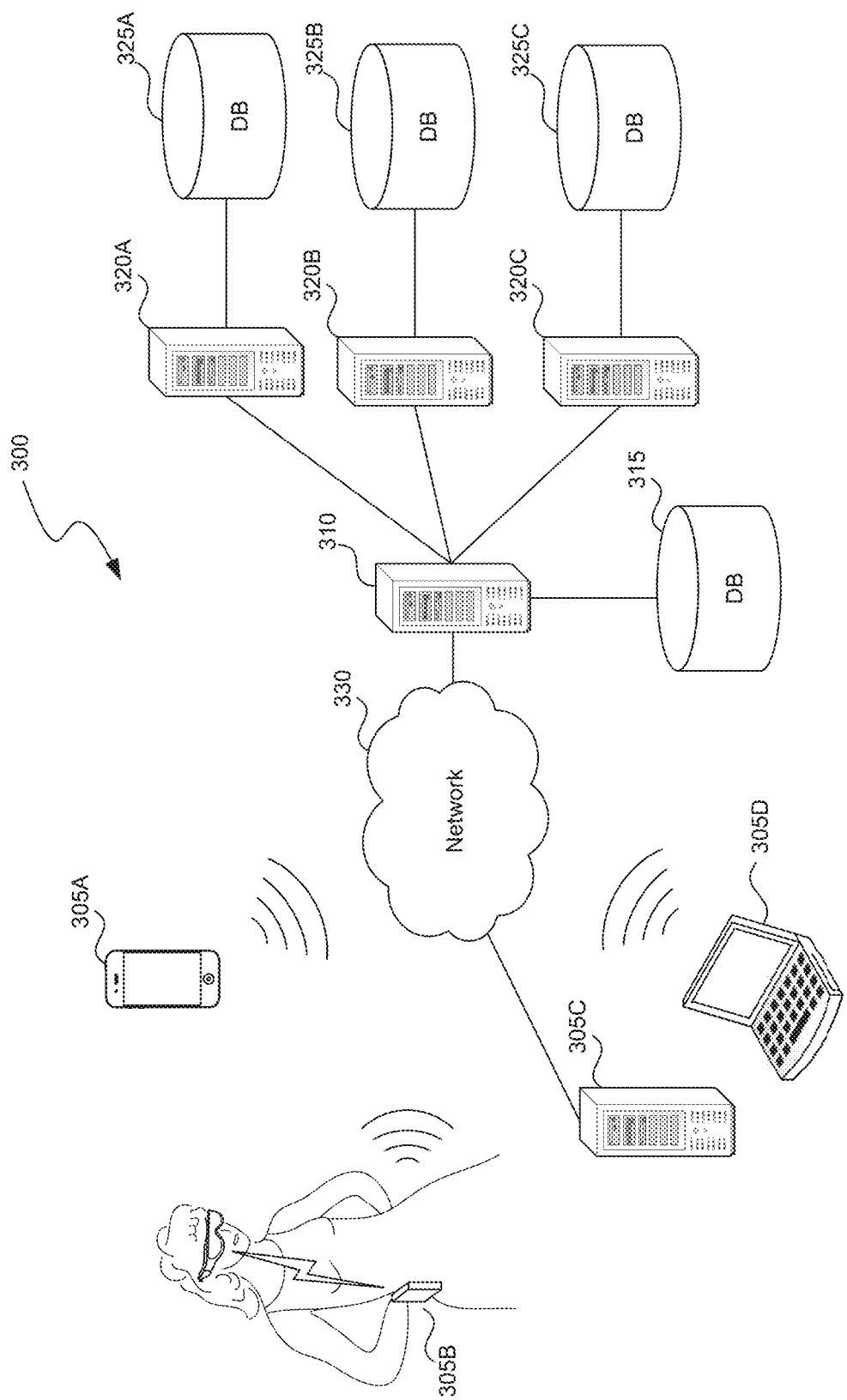
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea. Some glints displayed by the glint management system can be created by a social media application and can link to, or otherwise be associated with, social networking system objects and/or content items.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. In some implementations, these content items or interactions can be associated with an object or physical location, allowing them to be presented as glints by the glint management system. A social networking system can provide various means to interact with non-user objects within the social networking system, Actions can be represented, in various implementations, by a node or edge between nodes in the social graph. For example, a user can form or join groups, or become a fan of a page or entity within the social networking system or interact with glints displayed around them in their environment. In addition, a user can create, download, view, upload, link to, tag, edit, or play a social networking system object. A user can interact with social networking system objects outside of the context of the social networking system. For example, an article on a news web site might have a "like" button that users can click or a glint representing the social networking system objects can be displayed when the user's XR device recognizes a corresponding object or location. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. It can enable a user to comment on or associate a content item with a real-world object. And it can allow users to interact (via their personalized avatar) with objects or other avatars in a virtual environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, tag others on objects in the real world, or provide a artificial environment were users can communicate and interact via avatars or other digital representations of themselves. Further, a first user can comment on the profile page of a second user, or can comment on objects associated with a second user, e.g., content items uploaded by the second user (whether displayed on a social media site or as overlays to the real-world).

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, see glints associated with content they have attached to a real-world object, or to view pictures of another user. Likewise, becoming friends within a social networking system can allow a user greater access to communicate with another user, e.g., by email (internal and external to the social networking system), instant message, text message, phone, tag them on real-world objects, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Any of the above social graph features and connections can be used by the glint management system to identify glints to surface to particular users. For example, glints on objects in a user's physical area can be selected for display when they are associated with content created by someone within two hops on the social graph. As another example, glints can be selected when they relate to a subjected via the social graph as being of interest to the user. In various implementations, various models (e.g., deep neural network or other type of trained model) can be trained to identify glints to display to a particular user based on an identified context of the user (e.g., current location, other content items being displayed, other users in the area, etc.) and social graph information for that user.

Figure 4:
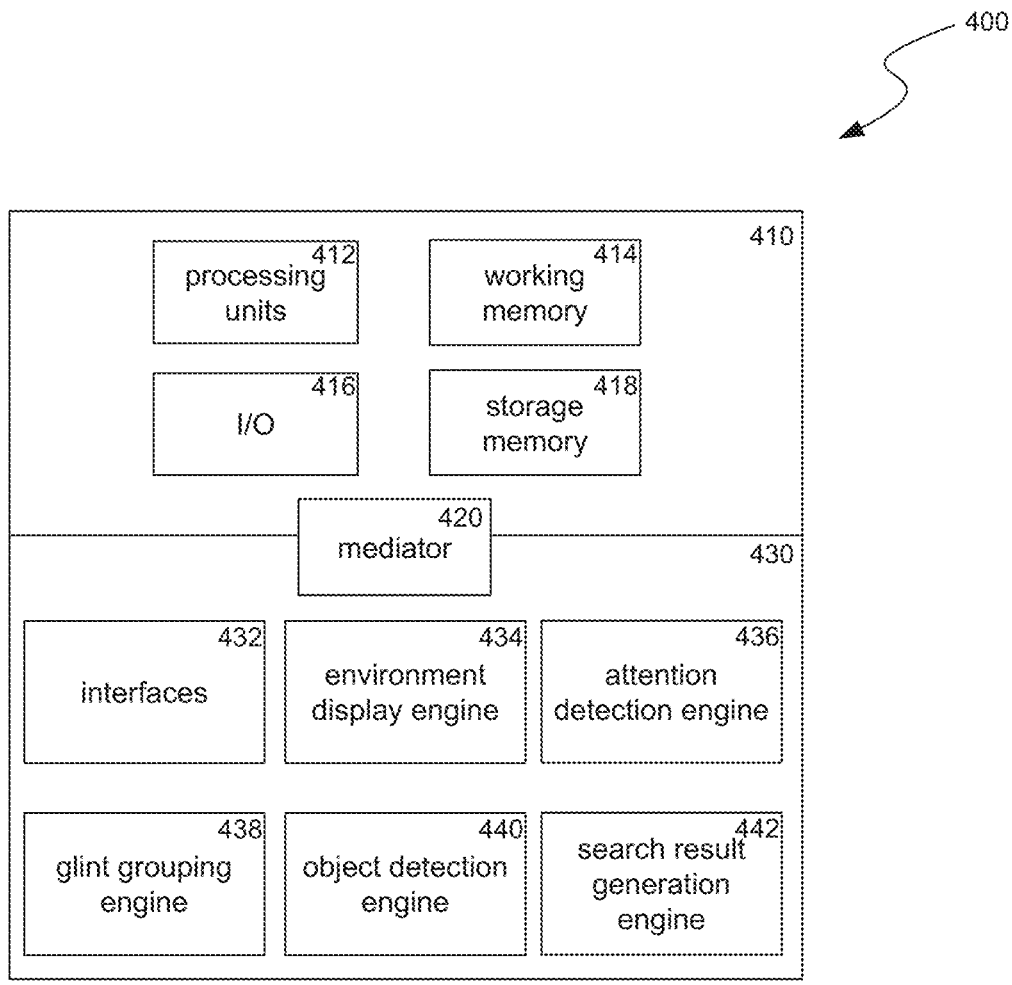
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations as described herein. Specialized components 430 can include an environment display engine 434, an attention detection engine 436, a glint grouping engine 438, an object detection engine 440, a search result generation engine 442, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Interfaces 432 can provide any of a variety of input/output parameters suitable to detect various aspects relating to the environment, glints, etc., as described herein. For instance, an input interface can include a series of sensors capturing environmental data that can be used to display an environment on the XR device. As another example, an input interface can include sensors capturing user motion/positioning information that can be used to derive an attention of the user on the displayed environment.

Environment display engine 434 can process environmental data and render a depiction of the environment of a display of the XR device as described herein. Further, the environment display engine 434 can map locations of real-world objects to detected objects depicted in the environment and identify glints associated with the real-world objects. This can allow for display of an environment including both real-world objects (e.g., seen by a user of an AR or MR device) and associated glints or other virtual objects, as described in greater detail below. In some implementations, the environment display engine 434 can display glints in different modes (e.g., on an area depicting out-of-view objects, a threshold amount above a corresponding object, or as attached to an object) depending on a determined distance between the corresponding object and the XR device. Additional details on displaying glints according to thresholds of an XR device to objects associated with the glints are provided below in relation to FIGS. 5 and 9.

Attention detection engine 436 can process user tracking data to derive an attention of the user. The attention of the user can include a focal point or intended direction as specified by user input. For example, sensors can track user eye/hand/head movement and the attention detection engine 436 can correlate the detected attention of the user to a position/location depicted in the environment displayed in the XR device. User attention characteristics can be used by environment display engine 434 to calibrate the display of glints depending on whether the user is directing her attention at a particular glint (e.g., showing it in a maximized or minimized mode). Additional details on user attention determinations and their effect on glints are provided below in relation to FIGS. 6 and 10.

Glint grouping engine 438 can detect locations of multiple glints in an environment and determine whether to replace individual glints with a single glint grouping indicator on the display. The glint grouping engine 438 can utilize a threshold number of glints and a specified area to determine whether to replace the glints with the glint grouping indicator. Additional details on glint grouping are provided below in relation to FIGS. 7 and 11.

Object detection engine 440 can process image data of detectable objects in an environment and detect an object type or other features (e.g., shape, associated labels, orientation, etc.) of the object. The object detection engine 440 can utilize a suitable object detection technique to compare features of the detectable object with known objects to derive object features. In some implementations, this can include employing machine learning models (e.g., deep neural networks, support vector machines, decision trees, etc.), trained on various image data with objects having feature labels, to determine features for particular objects.

In some instances, the object detection engine 440 can associate the detected object type with a confidence value that can be used to indicate an estimated accuracy of the detected object features. The system can incorporate either manual or automatic (e.g., machine learning) feedback to verify the accuracy of a detected object type that can be used to increase the accuracy of detection of subsequent objects. Additional details on object detection determinations are provided below in relation to block 802 of FIG. 8.

Search result generation engine 442 can process the detected object features with a series of potential results to derive a set of search results corresponding to the object. The search can be based on a combination of object type characteristics (e.g., brand of the object, typical actions taken with respect to the object) and user characteristics to derive search results specific to both the object features and the user. Such results can be displayed as glints by environment display engine 434 as attached to the detected object. Additional details on displaying glint search results attached to a detected object are provided below in relation to FIGS. 8 and 13.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
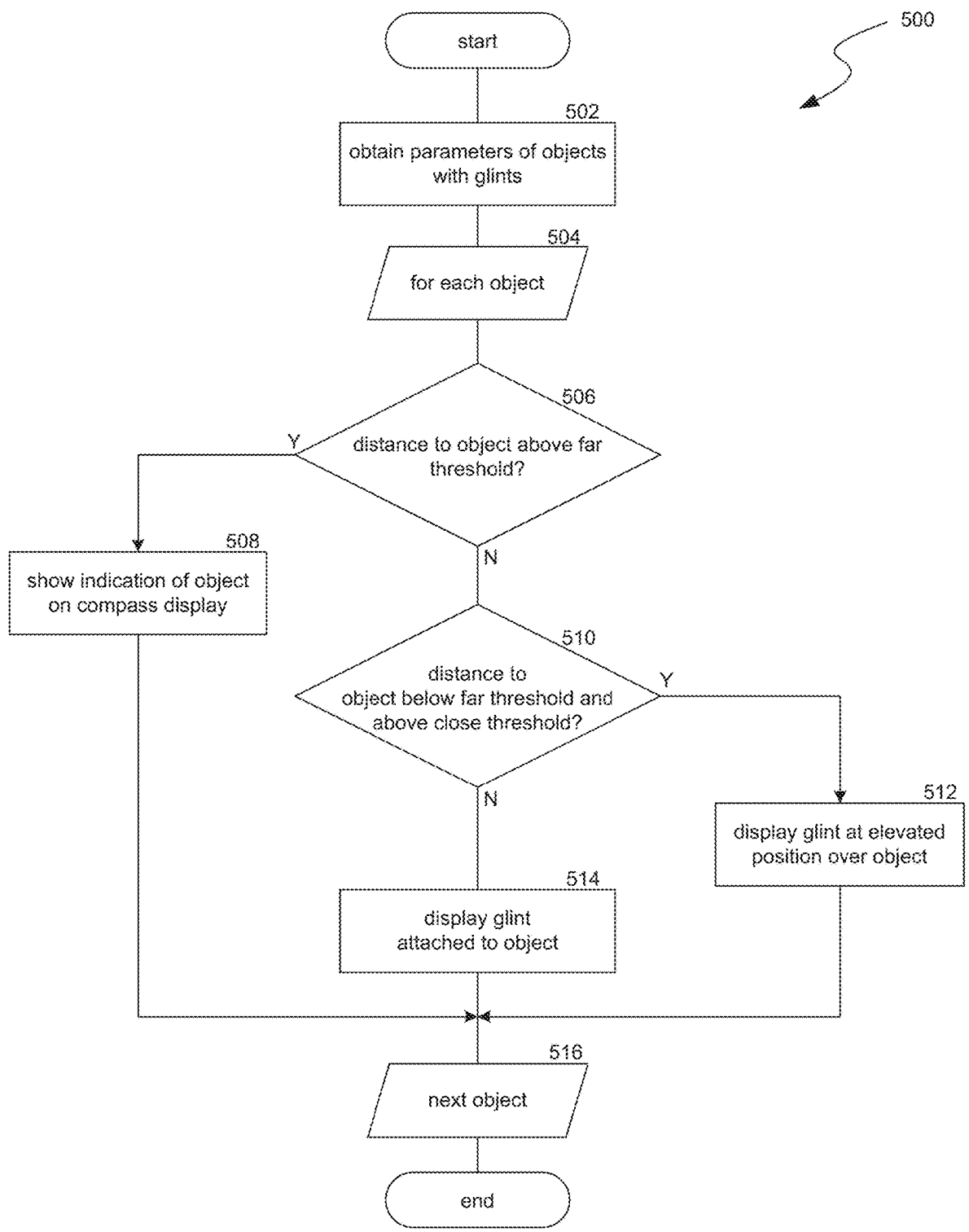
FIG. 5 is a flow diagram illustrating a process used in some implementations for displaying an object based on a distance between the object and an XR device.

FIG. 5 is a flow diagram illustrating a process 500 used in some implementations for displaying an object based on a distance between the object and an XR device. In various implementations, process 500 can be performed periodically (e.g., every 1 ms, 3 ms, or 10 ms) or responsive to a threshold change in location of the XR device. For example, the process 500 can be performed upon a threshold amount of movement (e.g., 2 or 5 feet) to identify glints in the environment. Process 500 can be performed locally on the XR device or performed by cloud-based device(s) that can respond with glints and virtual objects to display.

At block 502, parameters of objects with glints are obtained. The objects can include any of real-world objects (e.g., landmark, building, car, handheld object, etc.) or both real-world objects and virtual objects depicted in an environment. For instance, an object can include a point of interest (e.g., a park, building) associated with a specific geographic location depicted by a XR device as described herein. Parameters associated with the object can include a location of the object in a real-world environment (e.g., global positioning system (GPS) coordinates of the object), an object type (e.g., building, park, region, point of interest) associated with the object, a content-sharing platform (e.g., social media platform) associated with the object, etc. In some instances, parameters can be obtained for only objects within a threshold distance (e.g., 100 meters) of a specified position (e.g., a determined position of the XR device).

In some embodiments, the system as described herein can rank objects associating various features of detected objects. For example, detected objects can be ranked based on a determined user interest (e.g., a relation of a user associated with the detected object, content included in the object, other users interacting with the object). Responsive to ranking detected objects, a threshold amount of objects can be selected and only the selected objects can be displayed by the XR device. In some embodiments, the system can display only a threshold number of objects in each of one or more distance ranges (or there may be different threshold amount of objects that can be displayed in each of the one or more distance ranges).

In some implementations, some of the objects with glints in the area can be determined based on a pre-determined mapping of real and/or virtual objects to geographic locations (e.g., a simultaneous localization and mapping or "SLAM" system). In some implementations, some of the objects with associated glints can be objects identified by the XR device. For instance, the objects can be identified using an object detection technique or by identifying a code (e.g., QR code) attached to various objects, as described below.

In block 504, a loop between blocks 504 and 516 can be repeated for a number of detected objects (e.g., each object associated with glint(s) selected for display) in the environment.

In decision block 506, process 500 can determine whether a distance to an object is greater than a far threshold. A far threshold can include a maximum threshold distance (e.g., 50 meters) from a location of the user or the XR device. For instance, if an object is beyond a far threshold distance, a glint is only displayed on a compass presented on the display.

In block 508, if the distance to the object was determined at block 506 to exceed the far threshold, an indication of the object can be provided on a compass display. The compass display can be a display area depicting out-of-view objects. The compass display can include a portion of the display providing direction information of objects in the environment. For example, the compass display can include a mini-map or an arrangement of object according to a direction of the object with a distance indicator. The distance indicator can include changing the size of the object or opacity of the object as the distance of the object changes. Additional details on a compass display are provided below in relation to FIG. 9.

In decision block 510, if the distance to the object falls below the far threshold, it is determined whether a distance to the object is both below the far threshold and above the close threshold. The close threshold can include a threshold distance (e.g., 10 meters) that is less than that of the far threshold.

In block 512, responsive to determining that the distance to the object being both below the far threshold and above the close threshold, the glint for the object is displayed at an elevated position over the object. For example, this can include displaying the glint a threshold amount above the object that is related to the glint. Additional details on displaying a glint in such an elevated position are provided below in relation to FIG. 9.

In block 514, responsive to determining that the distance to the object is not both below the far threshold and above the close threshold, the glint is displayed as attached to the object. This can include displaying the glint over the object, a specified amount to the left, right, above, or below the object and orientated to face the XR device. This orientation can update to keep the glint in this position, relative to the object, from the XR device user's point of view (unless the user moves away from the object such that it is displayed according to block 512 or 508). Additional details on displaying a glint attached to an object are provided below in relation to FIGS. 9 and 13.

In block 516, the loop between block 504-516 can be repeated for a number of detected objects (e.g., objects with glint(s) selected for display) in the environment. Once each of the glints have been displayed via this loop, process 500 can end (until it is called again as discussed above).

Figure 6:
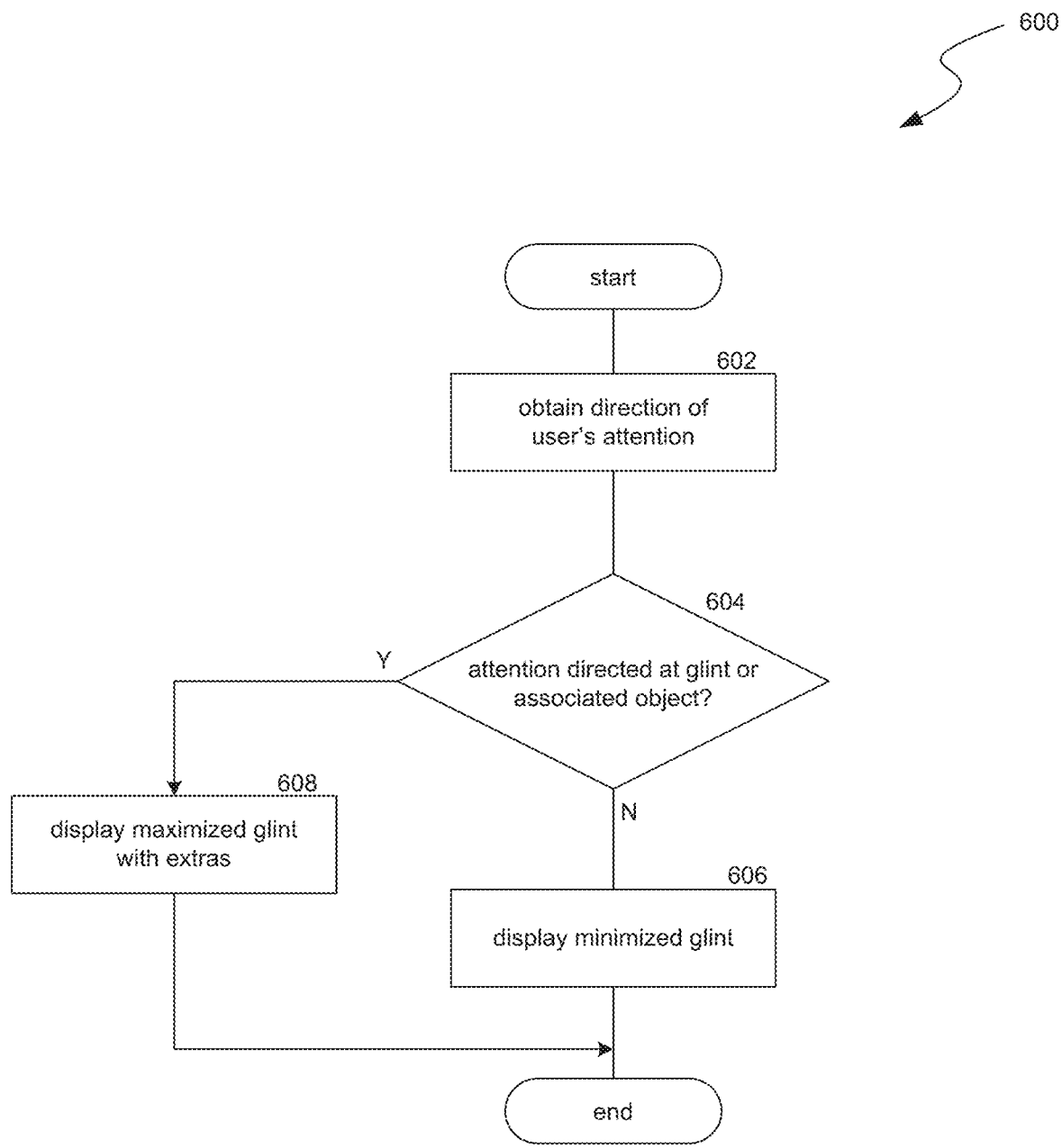
FIG. 6 is a flow process for modifying a display including a glint responsive to a detected attention direction of the user.

FIG. 6 is a flow process 600 for modifying a display including a glint responsive to a detected attention direction of the user. The process 600 can be performed periodically (e.g., every 1 ms, 3 ms, or 10 ms) or responsive to a threshold amount of change in direction of the user's attention. For example, the process 600 can be performed responsive to detecting eye/head/hand tracking data on the XR device has changed a threshold amount (e.g., a 2, 5, or 10 degree change in user viewpoint).

At block 602, process 600 can obtain a direction of the attention of the user. The attention of the user can be tracked/identified using any of eye tracking, head direction tracking, hand tracking (e.g., determining whether the user is casting a ray from their hand), etc. The system as described herein can obtain and process attention-related data (e.g., eye or hand tracking sensor data—e.g., images of the user's eye(s) and/or hands or location and/or IMU data from a device attached to the user's hand(s), head direction sensor data—e.g. location and/or IMU data) to identify a direction of the attention of the user. As noted below, the direction of the attention of the user can be utilized to identify a focal point of the user operating an XR device and to perform subsequent actions based on the direction of the attention of the user.

At decision block 604, process 600 can determine whether the direction of the attention of the user is directed at a glint or an associated object. For example, one or more glints (e.g., a virtual object, an icon representing an interaction of another user in a real-world environment, etc.) in an environment displayed on the XR device can be selected based on the attention of the user being focused on a glint or other object in the environment. This can include determining whether a determined direction of attention is within a threshold proximity to the glint/object in the environment.

At block 606, responsive to determining that the direction of the attention of the user is not directed at a glint or an associated object, the glints displayed in the environment (e.g., via process 500) are displayed in a minimized form. The minimized glint can include a depiction of the glint in the environment that excludes additional or supplemental content, as is described with respect to block 608. The minimized glint can be minimized in pre-determined size based on determining that the direction of the attention of the user is not directed at a glint or an associated object. In some implementations, all minimized glints can have a common format, such as a specified size and/or shape. An application in control of the glint can specify the content shown in the minimized glint—such as an icon corresponding to that application and an image indicative of the virtual object the glint represents. Additional details on displaying a glint in a minimized form are provided below in relation to FIG. 10.

At block 608, responsive to determining that the direction of the attention of the user is directed at a glint or an associated object, a maximized glint with extras can be displayed. For example, responsive to detecting that the gaze of the user is directed at a glint, the glint can be increased in size and/or modified to display additional information. Additional information displayed with the glint can include a deep link or other application action that can be performed. A deep link can include an interface that allows for expansion of the glint to preview content, routing of commands to the associated application, shortcuts to controls for other applications, opening other virtual objects, adjustment of the glint, etc. Responsive to a subsequent selection of a deep link, the full application can be displayed, linked content can be shown, an action mapped to the link can be taken, etc. Another application action can include displaying shortcuts to other actions, such as actions to open an application, play a video, modify the glint, etc. In various implementations, the additional content that is displayed or the deep links that are provided in the maximized version of the glint can be specified by the application that crated the glint corresponding to an object. In some implementations, the XR system can specify confines for the maximized version of the glint, such as a maximum size, various templates for controls, default features (e.g., a default control to open the corresponding application), etc. Process 600 can then end, but can be repeated, as indicated above, upon a new trigger such as a detected threshold amount of movement or elapsed time.

Figure 7:
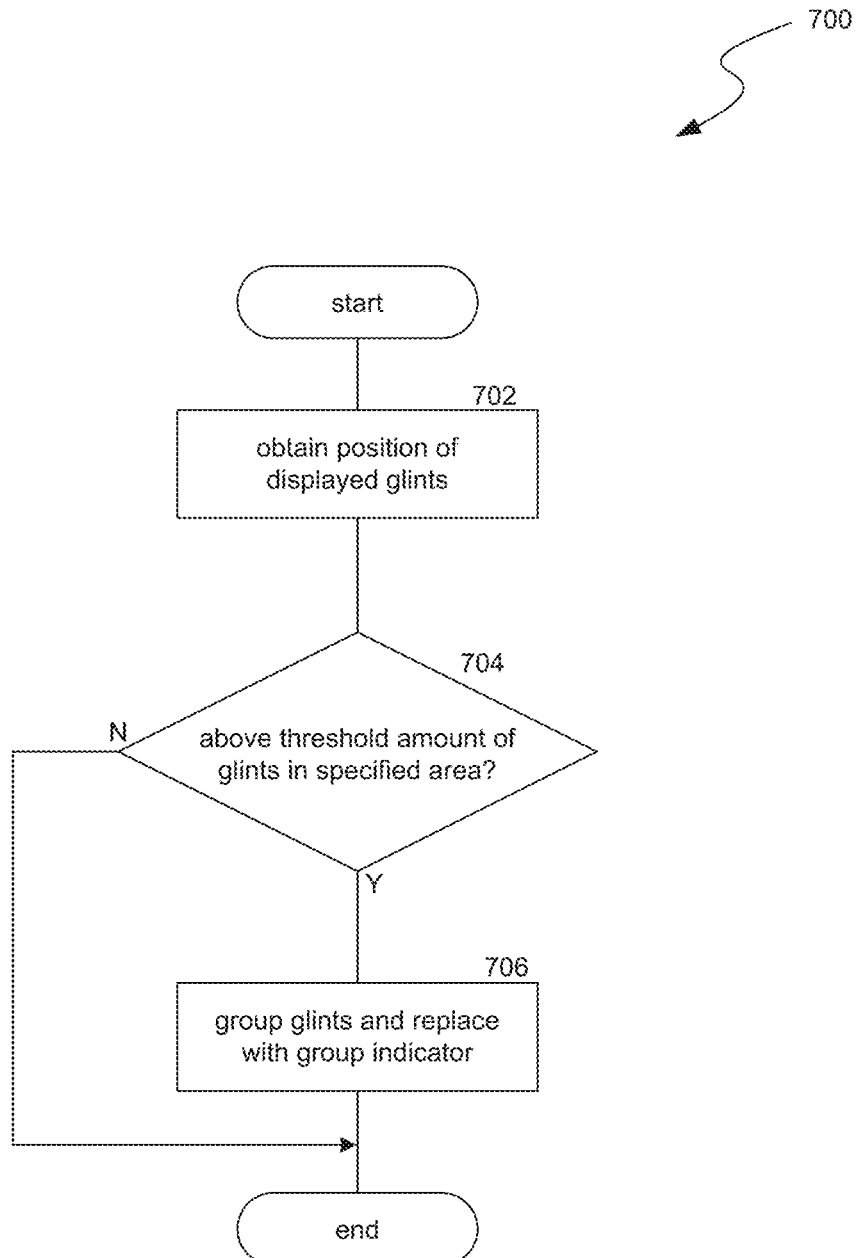
FIG. 7 is a flow process for grouping glints on a display of an XR device.

FIG. 7 is a flow process 700 for grouping glints on a display of an XR device. The process 700 as described herein can be performed periodically (e.g., every 1 ms, 3 ms, or 10 ms) or responsive to a threshold change in viewpoint of the XR device. For example, process 700 can be performed as a user moves around to changes her head position in an artificial reality environment, such as either of a lateral or horizontal movement (e.g., 6 inches, 1 foot, or 3 feet lateral or horizontal movement) or a rotational movement (e.g., 2 degrees, 5 degrees, or 10 degrees of head rotation in any direction).

At block 702, positions of displayed glints can be obtained. In some implementations, the position can include a field of view position, i.e., the position of each glint in the user's field of view. For example, the user's field of view can be seen as a two-dimensional plane and each glint can have a X, Y position on that plane. In other implementations, the position of the displayed glints can be a geographic position of the real-world object to which the glint relates. For example, each glint can have a X, Y, Z position in an environment, relative to a given origin, such that an absolute distance between each glint environment can be determined.

At decision block 704, it can be determined whether a number of glints in a specified area is above a threshold amount (e.g., 2 glints, 3 glints, 5 glints, 10 glints, etc.) For example, where the positions determined at block 702 are field of view positions, the distances between each glint in the field of view can be determined, or where the positions determined at block 702 are environment (e.g., X, Y, Z) positions, values of the shortest distance between each displayed glint can be determined. Next, groups of glints (e.g., where all glints are within a threshold distance of one another) can be determined, and any group with above the threshold number of glints can be identified.

At step 706, responsive to determining that a number of glints in a specified area is above the threshold amount, the number of glints are grouped and replaced with a group indicator. In some implementations, the group indicator can be another glint, e.g., with an indicator identifying a number of glints in the group it replaced.

In some instances, if the number of glints fall below the threshold amount, the indicator identifying the number of glints can be removed and the display can be updated to show the individual glints. This can be based on the distance between the indicator and the location of the user lowering such that the specified area changes and the threshold number of glints in the specified area changes. In some instances, the threshold amount for grouping glints and ungrouping glints may be different. In some implementations, a glint group indicator can be maximized by a user, (e.g., ungroups so the glints the group indicator replaces are shown), such as when the user focuses on the group indicator as described in process 600 or the user directs a gesture (e.g., an "air click") or otherwise selects the group indicator.

Figure 8:
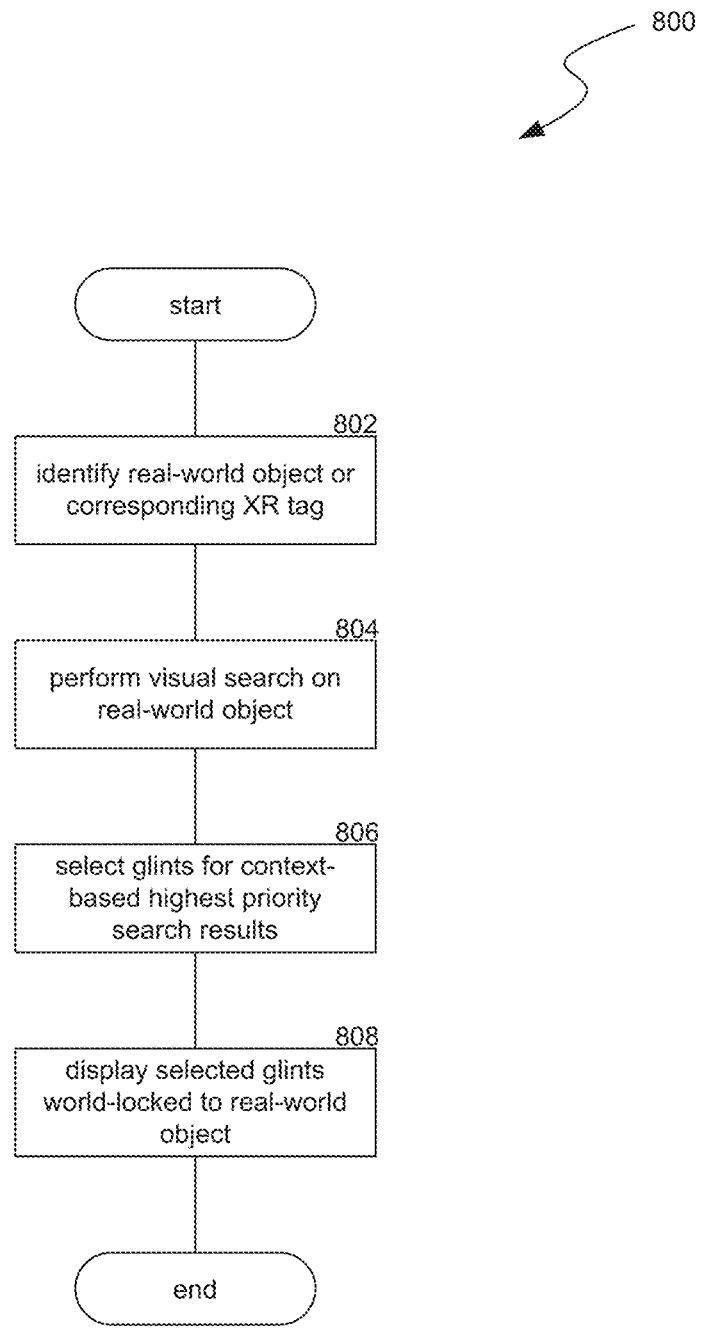
FIG. 8 is a flow process for displaying a series of glint search results relating to a real-world object.

FIG. 8 is a flow process 800 for displaying a series of glint search results relating to a real-world object. The process 800 as described herein can be performed periodically (e.g., every 1 ms, 3 ms, or 10 ms) or responsive to a threshold change in viewpoint of the XR device. For example, process 800 can be performed as a user moves around to changes her head position in an artificial reality environment, such as either of a lateral or horizontal movement (e.g., 6 inches, 1 foot, or 3 feet lateral or horizontal movement) or a rotational movement (e.g., 2 degrees, 5 degrees, or 10 degrees of head rotation in any direction).

At block 802, process 800 can identify a real-world object, corresponding XR tags, and/or object properties. This can be based on a suitable objection technique or a code detection technique (e.g., QR code detection). For example, the system can process image data of the environment to identify objects in the environment and/or XR tags in the environment. In some implementations, this can include utilizing a machine learning model trained to recognize objects. Such a model (e.g., a deep neural network) can be created using training data of images tagged with the object that image depicts. Various techniques can be used to train the model (e.g., back propagation and minimizing loss functions, etc.) and the model can have various characteristics and input/output modes (e.g., input/output nodes in a neural network, histogram input, a convolution and/or recumbency structure, etc.) Identifying the real-world object can include identifying an object label or ID; an object type or category; and/or other object characteristics (e.g., size, shape, colors, text markings, user association, location or physical relationship to other objects, etc.) This can include comparing features of the object with known objects to identify a content type of the object.

At block 804, process 800 can perform a visual search on the real-world object. The visual search can be performed by providing one or more of the identifications from block 802 to a search system (either on the XR device or through a network interface). In some implementations, the search system can be a social network. For example, a social network can receive object parameters, and in some cases an identification of the user of the XR device, and can perform as search against a social graph or other content store. As another example, the search can be performed against additional or alternative external sources (e.g., wiki entries, news stores, content items in other applications, etc.) The results of the search can be one or more content items related to the object. This can be any manner of content item such as user tag/comments, database entries, shopping options, associated social media content, images or other media, links to websites, applications with associated content, etc. There can be content providers that will receive the object ID and will provide content results. In various implementations, search results can have an associated similarity score (i.e., score for how well the result matches the identified object parameters, user, or other search criteria) or other ranking metric (e.g., relevance to features identified in the artificial reality environment, how popular the result is with other users, an estimation of value of the content item to the current user, etc.) The similarity score or ranking metric can indicate a confidence of the match to the content type and can be used to increase accuracy in detection of the object. In some implementations, a specified number of results will be displayed in relation to the object, and the similarity score or other ranking metrics can be used to sort the results (i.e., generate a list of context-based priority search results) and select the specified number of highest scoring results. The search results can be ranked based on a ranking system. For instance, the system can use a ranking metric or an internal system to match features of the returned content items to the user (e.g., known preferences, friends, interests). Based on a threshold similarity or number of matched features, the search results can be ranked as being most relevant content items for the user.

At block 806, process 800 can select glints for the context-based highest priority search results. The glints can include virtual objects that can be associated with the real-world object, as noted above. For example, glints can all be a specified size and/or shape (e.g., a circle with a given diameter) that indicates a picture, application icon, 3D model, etc., associated with the selected search result. The glints can link to different actions or applications that can be selected/presented to the user based on a selection of the glint by the user.

In block 808, process 800 can display selected glints as world-locked to real-world object. This can include associating the glints to the object and presenting the glints near the object (e.g., a set distance to the right, left, above, or below the object, from the XR device user's point of view). This can allow for the glints to be displayed near the object as the user moves their perspective about the environment. This can allow for the glints to be displayed, without regard to the rotation of the object, as always facing the user. Additional details on displaying glints for search results of real-world objects are provided below in relation to FIG. 13.

Figure 9:
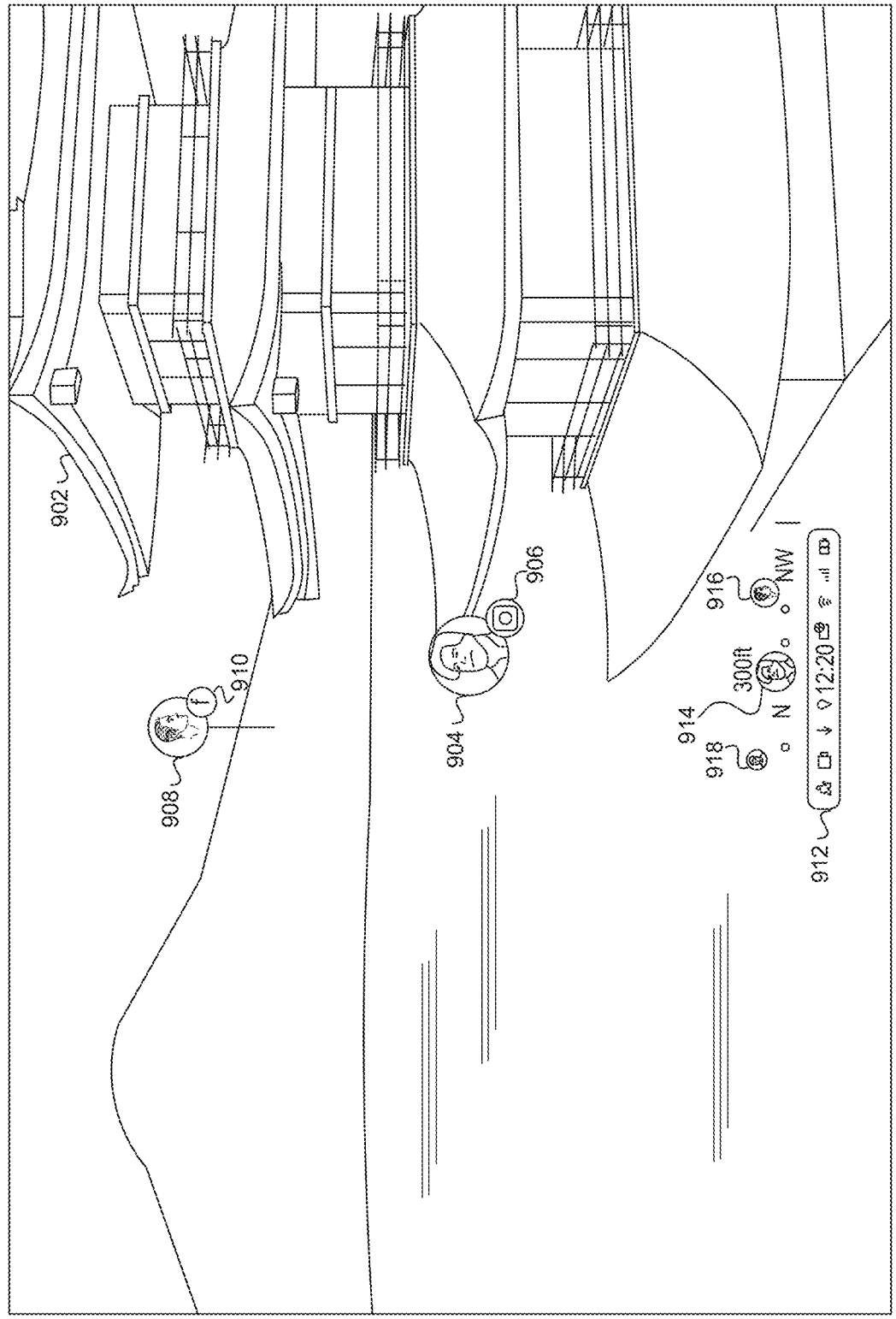
FIG. 9 is an illustration of an environment as displayed on an XR device, with glints at different distances.

FIG. 9 is an illustration of an environment 900 as displayed on an XR device, with glints at different distances. As shown in FIG. 9, an environment 900 displayed on an XR device can include any of a real-world environment (e.g., an environment displayed through an augmented-reality (AR) device) or a virtual environment (e.g., an environment displayed virtually through a virtual-reality (VR) device). The environment 900 can include various objects and locations (such as landmarks, parks, mountains, buildings, e.g. point of interest 902) or other geographic positions. The user can modify the display of the environment 900 by moving the display or by moving about the real-world environment.

Based on identified objects in the environment 900, various glints can be selected and displayed. In this example, glints include an icon representation the application that the glint links to and an image relating to content from the application associated with the object the glint is associated with. For example, glint 904, which is associated with the object of building 902, can be from a photo sharing social media platform and the glint can link to a photo from a friend of the current user who tagged the location of the building 902 when he posted the photo. Thus, glint 904 can include an indicator of a user who posted the photo and an indicator 906 for the social media platform that will open if the glint is selected. This can allow for a user to geographically place glints or other social interactions in an environment that can be viewed and engaged with by other users.

Building 902 is within a closest threshold to the XR device and is therefore glint 904 is displayed as attached to the building 902. The environment can also include one or more glints for an intermediate range (e.g. above the closest threshold but below a farther threshold) such as glint 908 displayed in the environment. As noted above, some glints can be a virtual object indicative of a social interaction in the environment. For example, glint 908 links to a social media platform as indicated by icon 910 in which the social interaction arises, where the social media interaction occurred at a location associated with the position of glint 908. For example, the glint 908 can represent an image of a point of interest, and the glint can be associated with or pinned to the corresponding geographic location. In the intermediate range, glints can be displayed a threshold amount above the associated object/location. This threshold amount can be a set physical distance, a distance in the user's field of view (e.g., one inch in the field of view above the object), or a determined amount such that the glint is not occluded by other objects in the field of view.

As noted above, when selected by the user, a glint can expand to provide more detail regarding the social interaction, such as to show the image taken by the user and posted to a social media platform, for example. In some embodiments, responsive to selecting the glint, the user display can move to a virtual geographic location of the glint or present more information relating to the user presenting the glint. In some cases, the glint selection can also allow for a user to open another application (e.g., a social media application, web browser, etc.) and perform subsequent actions, such as comment on the social interaction, for example.

The display can include a compass 912 or other similar direction indicator as a display area depicting out-of-view objects. The compass 912 can include direction indicators indicating a direction that the user is facing. The compass can also include a number of glint indicators (e.g., 914, 916, and 918) indicating glints that are above the farther threshold distance from the user and/or are out of the current field of view due to the gaze directional of the user. In some cases, these glints (e.g., glint 914) can indicate a distance to the object associated with the glint and/or a direction of that glint (e.g., glint 918 is positioned on the compass to indicate it is to the north east while glint 916 is positioned on the compass to indicate it is to the north west).

The display can also include a series of interfaces that allow for other actions to be performed by the user. Such actions can include moving the location of the user, record a video or audio, pin a geographic location of the user, modify XR device settings, etc.

Figure 10:
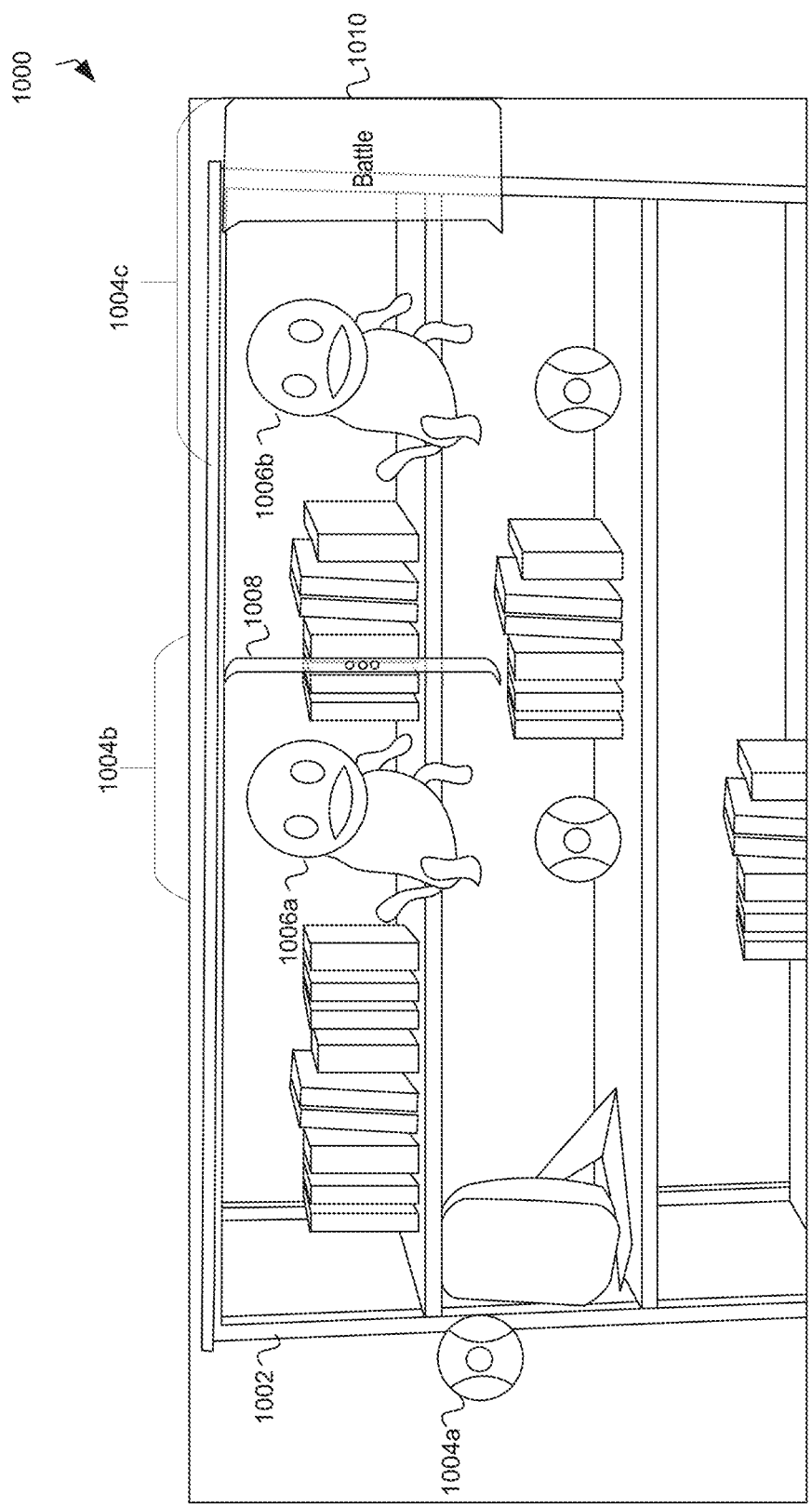
FIG. 10 is an illustration of a glint displayed in a maximized and minimized form in an environment depicted in an XR device.

FIG. 10 is an illustration of a glint displayed in a maximized and minimized form in an environment 1000 depicted by an XR device. As shown in FIG. 10, the environment 1000 can include a glint (e.g., 1004a-c, 1006a-b) that can be interacted with by the user. The glint can be either tied/associated with a feature in the environment (e.g., bookshelf 1002) and/or directed to a position of the display of the XR device. The glint can be controlled by a particular application, which can specify how the glint looks and acts in various modes (e.g., minimized and maximized modes). In some implementations, one or both modes can have a set configuration (e.g., shape, maximum size, area the application can drawn into, etc.)

The glint 1004 can be initially displayed in the environment in a minimized mode 1004a, e.g., when the user's attention is not directed at the glint. The glint 1004 can be selected to perform subsequent actions with respect to the glint. For example, responsive to hovering a ray projection at over the glint, directing the user's attention at the glint, or otherwise selecting the glint 1004a, the glint can be modified to display in a maximized version 1004b—e.g., showing additional information (e.g., a creature 1006a appearing near a second glint 1004b) and/or controls (e.g., control 1008). In this example, control 1008 can be further expanded responsive to selecting the ellipsis on the control 1008, providing access to a button to launch the application associated with the glint 1004 and perform an action (in this case start a creature "battle" game). The application associated with the glint can specify any type of control in the maximized mode, such as shortcuts to actions in the application without having to open the application, controls to take the user to a defined part of the application, links to websites or other applications, API calls, etc.

Figure 11:
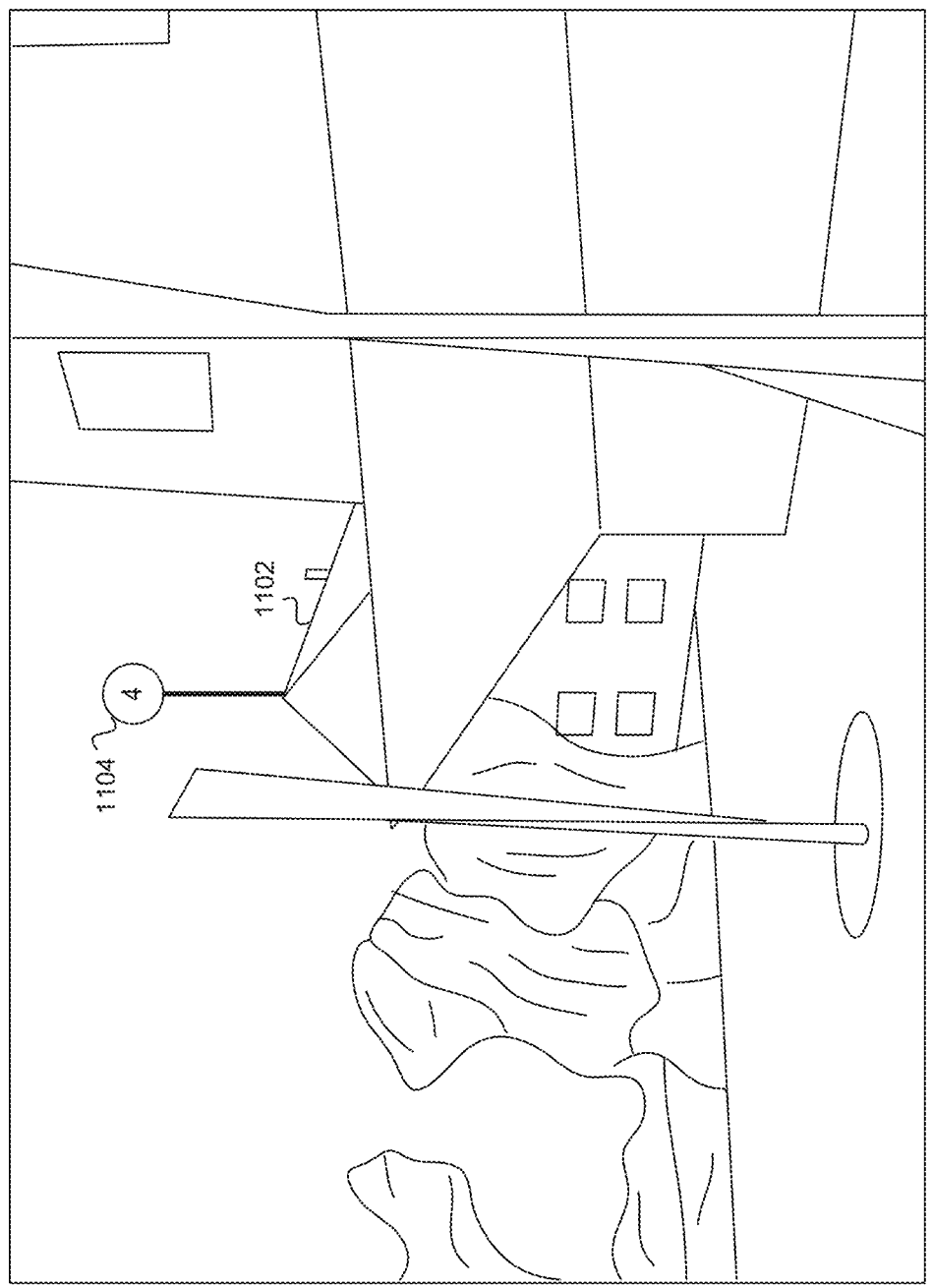
FIG. 11 is an illustration of an environment depicting a grouped glint indicator.

FIG. 11 is an illustration of an environment 1100 depicting a grouped glint indicator 1104. As discussed above in relation to FIG. 7, glints in environment 1100 can be groups when they are within a threshold distance from each other and can be replaced and represented by a group glint indicator 1004. In some implementations, glints can be groups when a threshold number of glints are attached to the same object (e.g., object 1102). The group glint indicator 1104 declutters the user's field of view, allowing for a single glint representing multiple virtual objects (e.g., multiple social interactions of multiple users). In some implementations, groups of glints are created when the group is a threshold distance away from the user and the group glint indicator 1104 can be removed and replaced with the original glints when the distance to the user falls below a threshold distance, as described above. In other implementations, a user selection of the group indicator 1104 can cause the group glint indicator 1104 to be removed and replaced with the original glints.

Figure 12A:
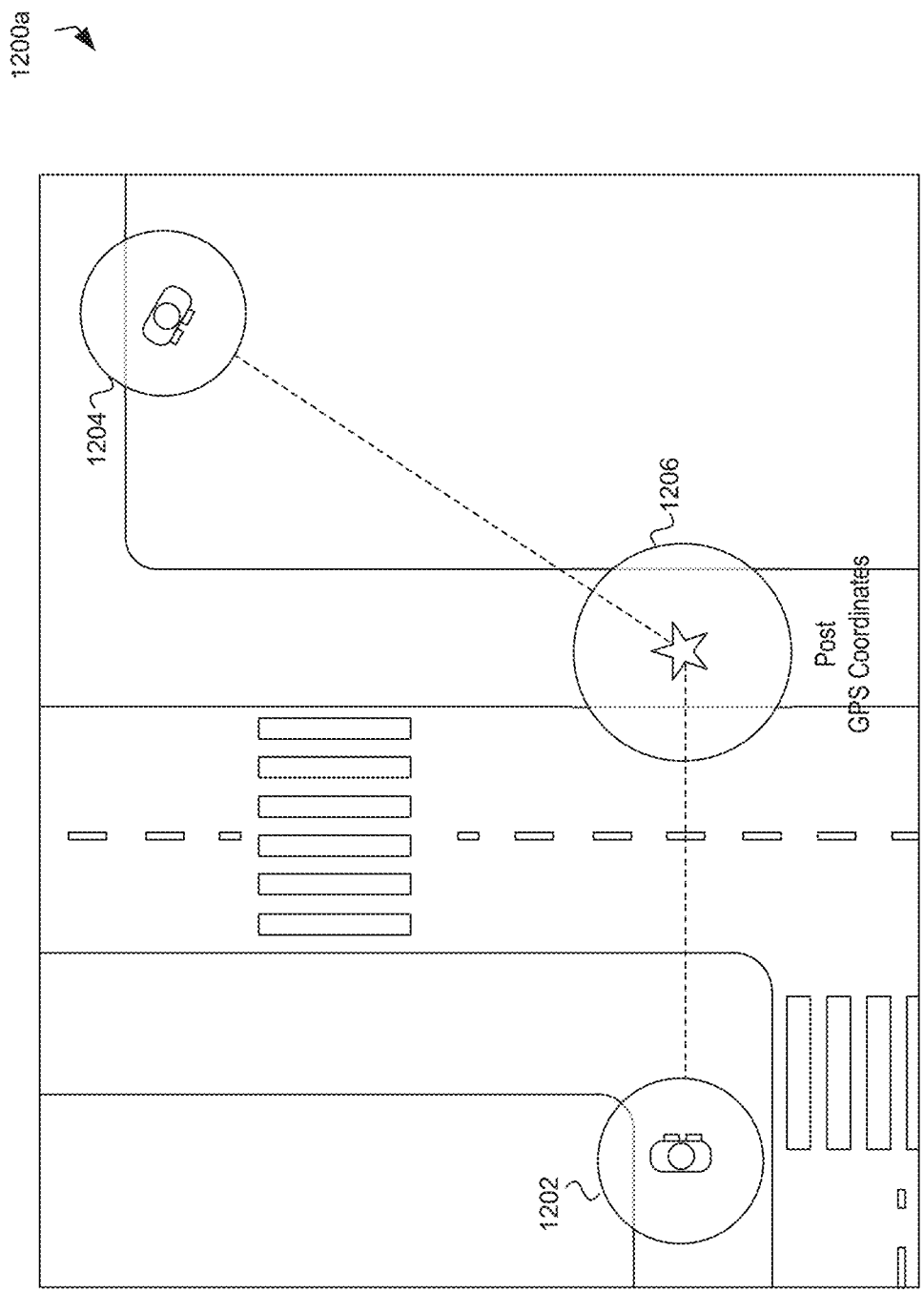
FIG. 12A illustrates a first example of displaying content based on a GPS geographic position.
Figure 12B:
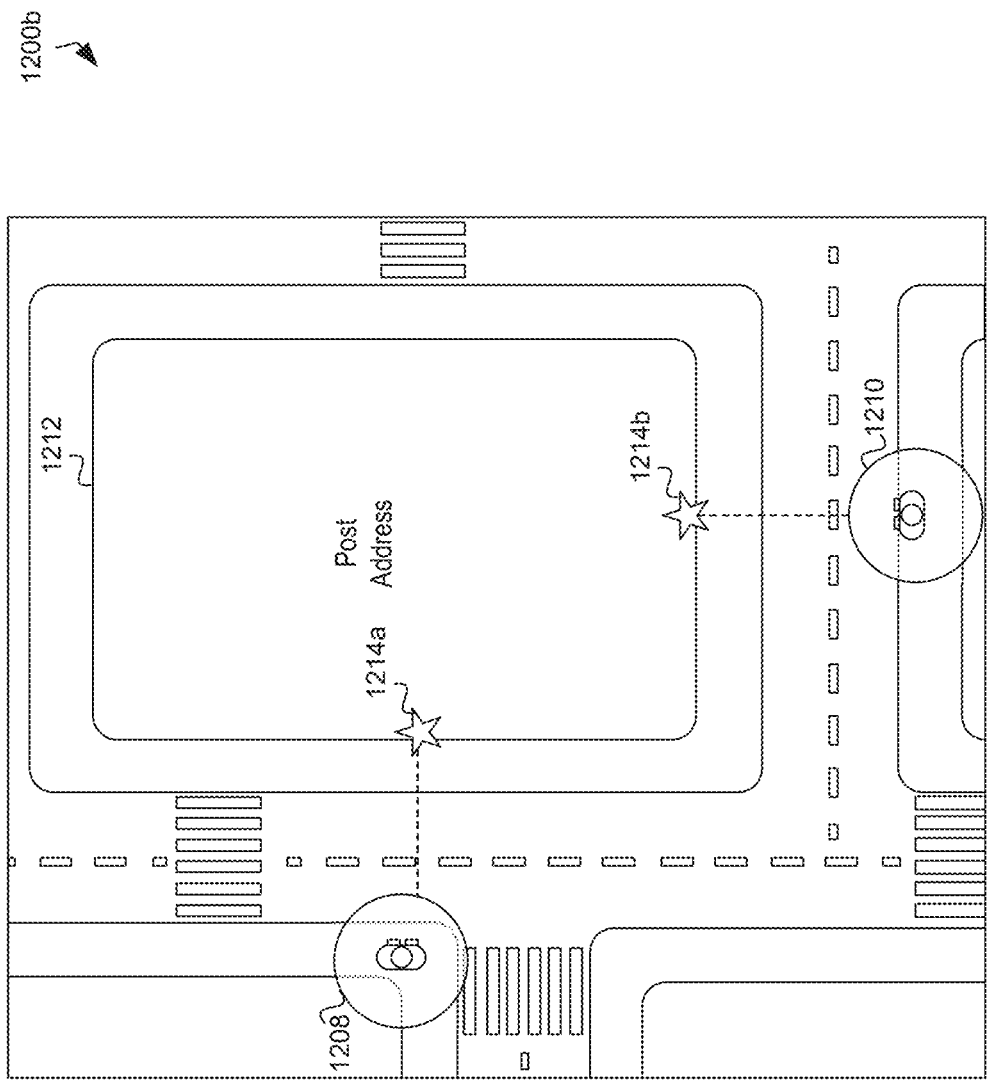
FIG. 12B illustrates a second example of displaying content to based on an address geographic position.

FIGS. 12A-B illustrate examples of users posting content to a geographic position. FIG. 12A illustrates a first example 1200a of displaying content based on geographic (e.g., a GPS or latitude/longitude) position. For instance, in FIG. 12A, multiple users 1202, 1204 can post content on various social media platforms and associate the post with a position 1206 (e.g., GPS coordinates). In turn, a user on an XR device can view an environment 1200a including the position and view glints depicted at that position. Because the content was tagged to specific coordinates, the associated glint is linked to those specific coordinates for both user 1202 and 1204.

As another example 1200b, in FIG. 12B, users 1208, 1210 can post content to an address 1212 (e.g., postal address) and users on an XR devices can view the environment 1200b including the post address and the glints (e.g., glint 1214) at the post address. In some instances, the glints can be associated with various perspectives of the post address, such as different angles of a landmark building. For example, because glint 1214 is attached to the address of building 1212, each of the viewers that see glint 1214 see it at the point of the building 1212 that is closest to them. Thus, user 1208 sees glint 1214a at a first position and user 1210 sees glint 1214b at a second position.

Figure 13:
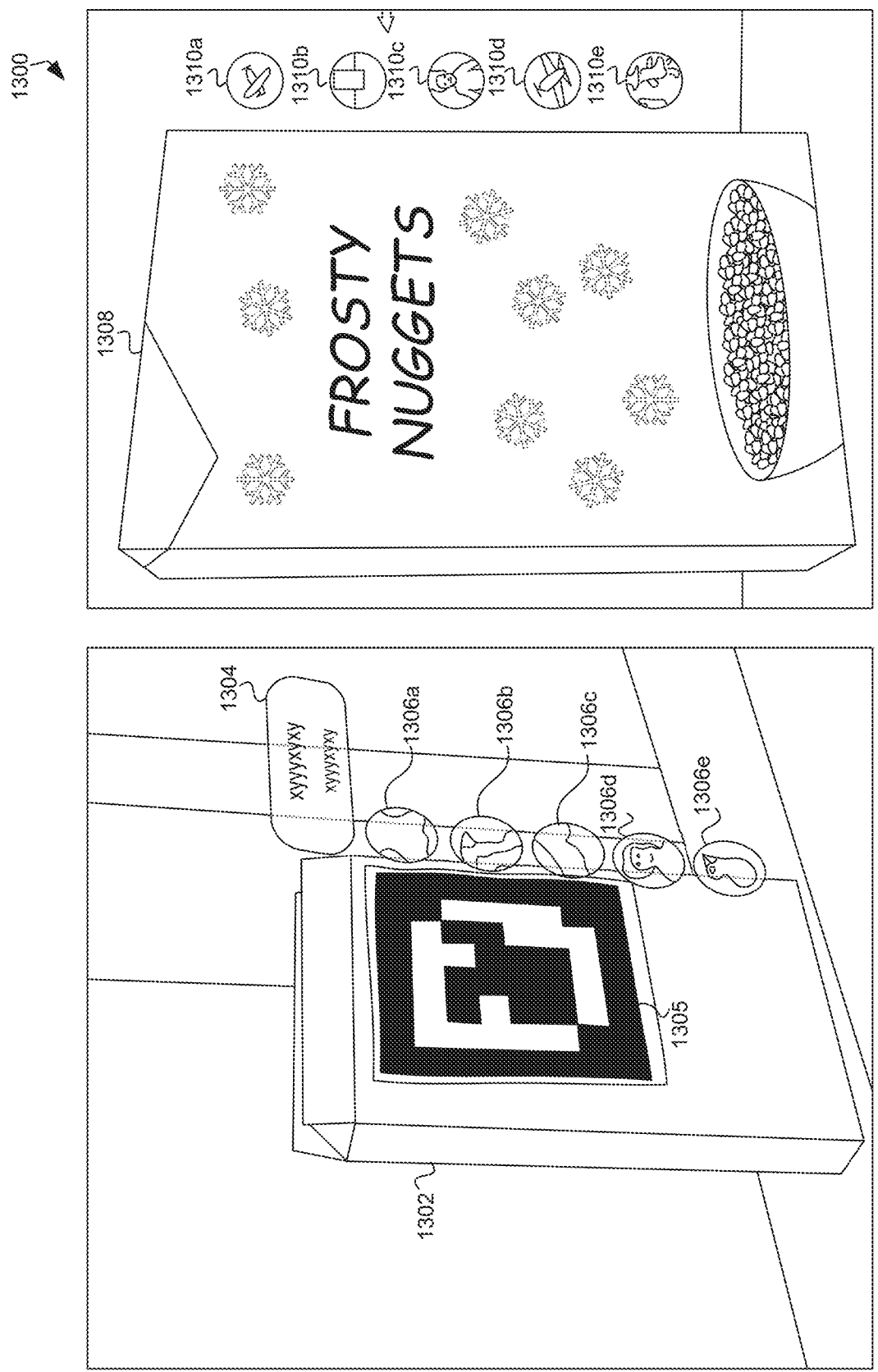
FIG. 13 illustrates two instances of real-world objects with corresponding glint search result virtual objects.

FIG. 13 illustrates two instances 1300 of real-world objects with attached glint search result virtual objects. As shown in FIG. 13, multiple detectable objects (e.g., 1302, 1308) are depicted in an environment displayed by an XR device. The objects can be detected via any of an object detection technique (as discussed above) and/or identifying a code (e.g., a QR code 1305).

As an example, a first object 1302 can include a QR code 1305 included on the object. The system can process the QR code data to identify the object and information relating to the object (e.g., an object type, brand of the object) via a data source specified in the QR code. Furthering this example, a second object 1308 can be detected using features of the object and comparing the features with characteristics of known objects (e.g., using a machine learning model).

As discussed in relation to FIG. 8, the system can process information relating to a detected object to derive relevant search results (e.g., first set of search results 1306a-e, second set of search results 1310a-e) for the object. Search results can include various applications, links to websites, games, videos, etc., that relate to the object that can be presented to a user on an XR device as virtual objects. The search results can be ranked based on a relevance to the user (e.g., based on previous actions taken by the user, based on user characteristics) and/or relevance to the object. In some instances, additional information (e.g., text 1304) can be presented along with the search results.

The search results can be associated with the object and presented on the display in the environment as virtual objects. For instance, the virtual objects can include selectable interfaces that can allow for subsequent actions to be taken (e.g., open an application, play a video) responsive to the user selecting the virtual object. The virtual objects can be tied to the object such that the virtual objects remain near the object as the user moves about the environment or modifies the display of the environment.

In some embodiments, a method for presenting a glint associated with an object in an environment depicted by an extended reality (XR) device is disclosed. The method can include identifying the object in the environment depicted by the XR device. The object (e.g., a building, landmark, point of interest in the environment) can include the glint linked to a geographic position of the object. The glint can include a virtual object, such as an indication of a social interaction on a social media platform or a virtual object capable of being selected and having further actions taken.

The method can include determining that a distance between the geographic position of the object and a location of the XR device is greater than a first threshold distance. In response to the distance between the geographic position of the object and a location of the XR device is greater than a first threshold distance, an indication of the glint can be presented on a display area depicting out-of-view objects. Responsive to determining that the distance between the geographic position of the object and the location of the XR device has updated to be less than the first threshold distance and greater than a second threshold distance that is less than that of the first threshold distance, the glint can be presented a threshold amount above a visible object that is related to the glint; and Responsive to determining that the distance between the geographic position of the object and the location of the XR device has updated to be less than the second threshold, the glint can be presented as attached to the object that is related to the glint. The glint attached to the object can include presenting the glint in a minimized form and wherein, responsive to detecting a first selection action of the glint, the presentation of the minimized glint is updated to a maximized version with A) controls for interacting with the glint or B) additional content associated with the glint.

In some embodiments, presenting the indication of the glint on a display area depicting out-of-view objects includes presenting the glint in a minimized form on a compass portion of the environment displayed on the XR device.

In some embodiments, the threshold amount that the glint is displayed above the visible object related to the glint is an amount determined to make the glint higher than an intervening object that is between the XR device and the object related to the glint.

In some embodiments, presenting the glint as attached to the object related to the glint comprises presenting the glint to be, from a point of view of a user of the XR device, a pre-determined amount to the left or right of the object related to the glint.

In some embodiments, the first selection action of the glint includes determining that an attention focal point of the XR device is directed at a location of the glint, wherein the focal point is determined by the XR device based on any of eye tracking for a user, head tracking for the user, hand tracking for the user, or any combination thereof.

In some embodiments, the maximized version of the glint, includes displaying the controls for interacting with the glint, and wherein the controls provide access to actions for an application relating to the glint, the actions being responsive to detecting a second selection action in relation to the controls.

In some embodiments, the maximized version of the glint includes displaying the additional content, wherein the additional content includes an indication of an interaction on a social network in relation to the object, and wherein the object is a real-world object in the environment.

In some embodiments, the method includes determining that the glint is one of a number of glints within a specified area and responsive to determining that the number of glints are within the specified area, updating the environment displayed on the XR device to replace the number of glints with a group glint indicator indicative of the number of glints.

In some embodiments, the method includes identifying the object as a first detected object by comparing detectable features of the object with characteristics of a series of known objects. The method can also include processing visual features of the first detected object to derive a series of search results corresponding to content and/or applications relating to the first detected object. The method can also include identifying one or more glints, including the glint, based on the search results. The method can also include presenting the one or more glints, in the environment depicted in the XR device, in spatial relation to the object.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for presenting a glint related to an object in an environment depicted by an extended reality (XR) device, the method comprising:
   identifying parameters of the object in the environment, the object related to the glint that is linked to a geographic position of the object;
   determining that a distance between the geographic position of the object and a location of the XR device is greater than a first threshold distance, and in response:
      presenting an indication of the glint on a display area depicting out-of-view objects;
   determining that the distance between the geographic position of the object and the location of the XR device has updated to be less than the first threshold distance and greater than a second threshold distance that is less than that of the first threshold distance, and in response:

presenting the glint a threshold amount above the object that is related to the glint; and
determining that the distance between the geographic position of the object and the location of the XR device has updated to be less than the second threshold, and in response:
presenting the glint as attached to the object that is related to the glint
wherein presenting the glint attached to the object includes presenting the glint in a minimized form and wherein, responsive to detecting a first selection action of the glint, the presentation of the minimized glint is updated to a maximized version with A) controls for interacting with the glint and/or B) additional content associated with the glint.

2. The method of claim 1, wherein presenting the indication of the glint on a display area depicting out-of-view objects comprises:
presenting the glint in a minimized form on a compass portion of the environment displayed on the XR device.

3. The method of claim 1, wherein the threshold amount, that the glint is displayed above the visible object related to the glint, is an amount determined to make the glint higher than an intervening object that is between the XR device and the object related to the glint.

4. The method of claim 1, wherein presenting the glint as attached to the object related to the glint comprises:
presenting the glint to be, from a point of view of a user of the XR device, a pre-determined amount to the left or right of the object related to the glint.

5. The method of claim 1, wherein the first selection action of the glint includes determining that an attention focal point of the XR device is directed at a location of the glint, wherein the focal point is determined by the XR device based on any of eye tracking for a user, head tracking for the user, hand tracking for the user, or any combination thereof.

6. The method of claim 1, wherein, the maximized version of the glint, includes displaying the controls for interacting with the glint, and wherein the controls provide access to actions for an application relating to the glint, the actions being responsive to detecting a second selection action in relation to the controls.

7. The method of claim 1,
wherein the maximized version of the glint, includes displaying the additional content,
wherein the additional content includes an indication of an interaction on a social network in relation to the object, and
wherein the object is a real-world object in the environment.

8. The method of claim 1, further comprising:
determining that the glint is one of a number of glints within a specified area; and
responsive to determining that the number of glints are within the specified area, updating the environment displayed on the XR device to replace the number of glints with a group glint indicator indicative of the number of glints.

9. The method of claim 1, further comprising:
identifying the object as a first detected object by comparing detectable features of the object with characteristics of a series of known objects;
processing visual features of the first detected object to derive a series of search results corresponding to content and/or applications relating to the first detected object;

identifying one or more glints, including the glint, based on the search results; and
presenting the one or more glints, in the environment depicted in the XR device, in spatial relation to the object.

10. A system comprising:
one or more processors; and
one or more memories storing instructions that, when executed, cause the one or more processors to perform a process comprising:
identifying parameters of an object in an environment depicted by an extra reality (XR) device, the object related to a glint that is linked to a geographic position of the object;
determining whether a distance between the geographic position of the object and a location of the XR device is greater than any of a first threshold distance and a second threshold distance, wherein:
responsive to determining that the distance is greater than both the first threshold distance and second threshold distance, an indication of the glint is presented on a display area depicting out-of-view objects is presented on the XR device;
responsive to determining that the distance is less than the first threshold distance and greater than the second threshold distance, the glint is presented a threshold amount above the object that is related to the glint; and
responsive to determining that the distance is less than both the first threshold distance and second threshold distance, the glint is presented as attached to the object related to the glint.

11. The system of claim 10, wherein presenting the glint attached to the object includes presenting the glint in a minimized form and wherein, responsive to detecting a first selection action of the glint, the presentation of the minimized glint is updated to a maximized version with A) controls for interacting with the glint and/or B) additional content associated with the glint.

12. The system of claim 10, wherein presenting the indication of the glint on a display area depicting out-of-view objects comprises:
presenting the glint in a minimized form on a compass portion of the environment displayed on the XR device.

13. The system of claim 10, wherein the maximized version of the glint, includes displaying the additional content, wherein the additional content includes an indication of an interaction on a social network in relation to the object, and wherein the object is a real-world object in the environment.

14. The system of claim 10, wherein the process further comprises:
determining that the glint is one of a number of glints within a specified area; and
responsive to determining that the number of glints are within the specified area, updating the environment displayed on the XR device to replace the number of glints with a group glint indicator indicative of the number of glints.

15. The system of claim 10, wherein the process further comprises:
identifying visual features of the object;
deriving a series of search results, based on the identified visual features, corresponding to content and/or applications relating to the object;
identifying one or more glints, including the glint, based on the search results; and presenting the one or more glints, in the environment depicted in the XR device, in spatial relation to the object.

16. A machine-readable medium having machine executable instructions stored thereon that, when executed by one or more processors, direct the one or more processors to perform a method comprising:
    determining that a distance between a geographic position of an object and a location of an XR device is greater than a first threshold distance and in response:
        presenting an indication of a glint related to the object on a display area depicting out-of-view objects;
    determining that the distance between the geographic position of the object and the location of the XR device has updated to be less than the first threshold distance and greater than a second threshold distance that is less than that of the first threshold distance and in response:
        presenting the glint a threshold amount above the object that is related to the glint; and
    determining that the distance between the geographic position of the object and the location of the XR device has updated to be less than the second threshold and in response:
        presenting the glint attached to the object that is related to the glint.

17. The machine-readable medium of claim 16, wherein presenting the glint attached to the object includes presenting the glint in a minimized form and wherein, responsive to detecting a first selection action of the glint, the presentation of the minimized glint is updated to a maximized version with A) controls for interacting with the glint and/or B) additional content associated with the glint.

18. The machine-readable medium of claim 17, wherein the first selection action of the glint includes determining that an attention focal point of the XR device is directed at a location of the glint, wherein the focal point is determined by the XR device based on any of eye tracking for a user, head tracking for the user, hand tracking for the user, or any combination thereof.

19. The machine-readable medium of claim 16, wherein the method further comprises:
    determining that the glint is one of a number of glints within a specified area; and
    responsive to determining that the number of glints are within the specified area, updating the environment displayed on the XR device to replace the number of glints with a group glint indicator indicative of the number of glints.

20. The machine-readable medium of claim 16, wherein the method further comprises:
    identifying visual features of the object;
    processing the visual features of the object to derive a series of search results corresponding to content and/or applications relating to the object;
    identifying one or more glints, including the glint, based on the search results; and
    presenting the one or more glints, in the environment depicted in the XR device, in spatial relation to the object.

\* \* \* \* \*